(12) United States Patent
Orui

(10) Patent No.: US 6,498,846 B1
(45) Date of Patent: Dec. 24, 2002

(54) METHOD AND SYSTEM FOR DISTRIBUTING DATA TO NODES IN PBX NETWORK

(75) Inventor: Takeo Orui, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/345,491

(22) Filed: Jul. 1, 1999

(30) Foreign Application Priority Data

Jul. 1, 1998 (JP) ............................................. 10-186565

(51) Int. Cl.[7] ................................................. H04M 3/00
(52) U.S. Cl. .......................................................... 379/279
(58) Field of Search ................................. 379/268, 269, 379/279

(56) References Cited

U.S. PATENT DOCUMENTS

| | | | |
|---|---|---|---|
| 4,625,081 A | * 11/1986 | Lotito et al. | .......... 379/196 X |
| H586 H | * 2/1989 | Kun | .......................... 370/384 |
| 4,866,758 A | * 9/1989 | Heinzelmann | ........... 379/93.15 |
| 4,872,160 A | * 10/1989 | Hemmady et al. | .......... 370/353 |
| 4,894,824 A | * 1/1990 | Hemmady et al. | .......... 370/380 |
| 4,977,582 A | * 12/1990 | Nichols et al. | .......... 370/517 X |
| 5,185,741 A | * 2/1993 | Iguchi et al. | ........... 379/133 X |
| 5,873,099 A | * 2/1999 | Hogan et al. | ................ 714/6 X |
| 5,892,764 A | * 4/1999 | Riemann et al. | ............. 370/401 |
| 6,393,016 B2 | * 5/2002 | Wegner et al. | .............. 370/352 |

FOREIGN PATENT DOCUMENTS

| | | |
|---|---|---|
| JP | 1-198895 | 2/1988 |
| JP | 9-215020 | 1/1996 |

* cited by examiner

Primary Examiner—Creighton Smith
(74) Attorney, Agent, or Firm—Foley & Lardner

(57) ABSTRACT

Disclosed is a system and method which can efficiently distribute local data supplied from a single maintenance terminal to all of nodes and can certainly make data synchronized among the nodes. One of a plurality of nodes constructing a PBX network is set to a master node 2 and the other nodes are set to slave nodes 3 and 4. Local data supplied from a data input unit 1 to the master node is retained in a data retaining unit 24 in the master node and is also formed in a transfer format obtained by adding a checksum of the local data and a destination node designated to each slave node to the local data by data editing means 22 in the master node. The local data in the transfer format is transferred by data transfer means 23 to the slave node through a transmission line 5 which can perform broadcast transfer. In each slave node, after checking whether the data is designated to itself or not and checking the checksum by data receiving means 31, the local data is retained into a data retaining unit 35 in the slave node.

26 Claims, 10 Drawing Sheets

METHOD AND SYSTEM FOR DISTRIBUTING DATA TO NODES IN PBX NETWORK

BACKGROUND OF THE INVENTION

1. Field of the Invention

The present invention relates to a method and system for distributing the same data to a plurality of nodes constructing a PBX (Private Branch Exchange) network.

2. Description of the Related Art

Hitherto, when the same local data is desired to be used by nodes in a PBX network constructed by a plurality of nodes, it is troublesome since a maintenance terminal has to access each of the nodes and enter the same data to each node. As the number of nodes increases, it becomes more troublesome.

It is an object of the invention to provide a data distributing method and system which can efficiently distribute local data supplied from a single maintenance terminal to all of nodes and certainly synchronize data among the nodes in a PBX network comprised of a plurality of nodes.

SUMMARY OF THE INVENTION

According to a data distributing method of the invention, one of a plurality of nodes constructing the PBX network is set as a master node and the other nodes are set as slave nodes, and local data supplied from a data input unit to the master node is retained in a data retaining unit in the master node. In the master node, the local data is formed in a transfer format by adding a checksum and a destination node designated to each slave node to the local data, and the local data in the transfer format is transferred to the slave node. In each slave node, the local data is retained into a data retaining unit in the slave node after checking whether the designated destination node is the slave node itself or not and checking the checksum.

The data transfer from the master node to each of the slave nodes is performed by broadcast transfer through a transmission line which can perform broadcast transfer.

Each of the slave nodes retains the local data in its data retaining unit, after that, returns reply data formed in a reply format in which the node number of the slave node is set as a transmission source and the node number of the master node is set as a destination to the master node, and the master node receives the reply data and transfers it to the data input unit.

The master node makes the data length of the local data included in the transfer format and transfers the local data in the transfer format.

The master node divides the local data every predetermined length into blocks, makes a serial number of each block included in the transfer format, and transfers the data in the transfer format.

The same data as the local data which is transferred to the slave node and stored in the data retaining unit in the slave node is similarly transferred for data collation from the master node, and each of the slave nodes collates the local data newly transferred with the local data which has been already retained in its data retaining unit and returns a collation result in a reply format in which the node number of the slave node is set as a transmission source and the node number of the master node is set as a destination to the master node.

According to a data distributing system of the invention, one of a plurality of nodes constructing a PBX network is set as a master node and the other nodes are set as slave nodes, the master node comprises a master data retaining unit, data writing means for writing local data supplied from a data input unit into the master data retaining unit, data editing means for editing the supplied local data together with a checksum of the local data and a destination node designated to each of the slave nodes into a transfer format, and data transfer means for broadcast transferring the edited data through a transmission line which can perform broadcast transfer to the slave node. Each of the slave nodes comprises a slave data retaining unit, data receiving means for checking whether data transferred from the master node is addressed to the slave node itself or not and receiving the data, and data writing means for writing the local data into the slave data retaining unit when the checksum of the received transfer data is checked and matched.

Each of the slave nodes comprises data return means for forming the data in a reply format in which the node number of the slave node itself is set as a transmission source and the node number of the master node is set as a destination after the local data is retained in the slave data retaining unit of the slave node and returning reply data in the format to the master node, and the master node has data receiving means for receiving the data returned from the slave node and transferring the data to the data input unit.

The data editing means in the master node makes the data length of the local data included in the transfer format.

The data editing means in the master node divides the local data into blocks on a predetermined length unit basis and makes a serial number of each block included in the transfer format.

The data transfer means in the master node similarly transfers the local data for data collation, which is the same as the local data transferred to the slave node and stored in the slave data retaining unit in the slave node. Each of the slave nodes is further provided with a data buffer unit for storing the local data newly transferred and data collating means for collating the local data stored in the data buffer unit with the local data which has been already retained in the data retaining unit, and the data returning means in each of the slave nodes returns a collation result in a reply format in which the node number of the slave node itself is set as a transmission source and the node number of the master node is set as a destination to the master node.

DETAILED DESCRIPTION OF THE PREFERRED EMBODIMENTS

Embodiments of the invention will be described in detail with reference to the drawings.

Figure 1:
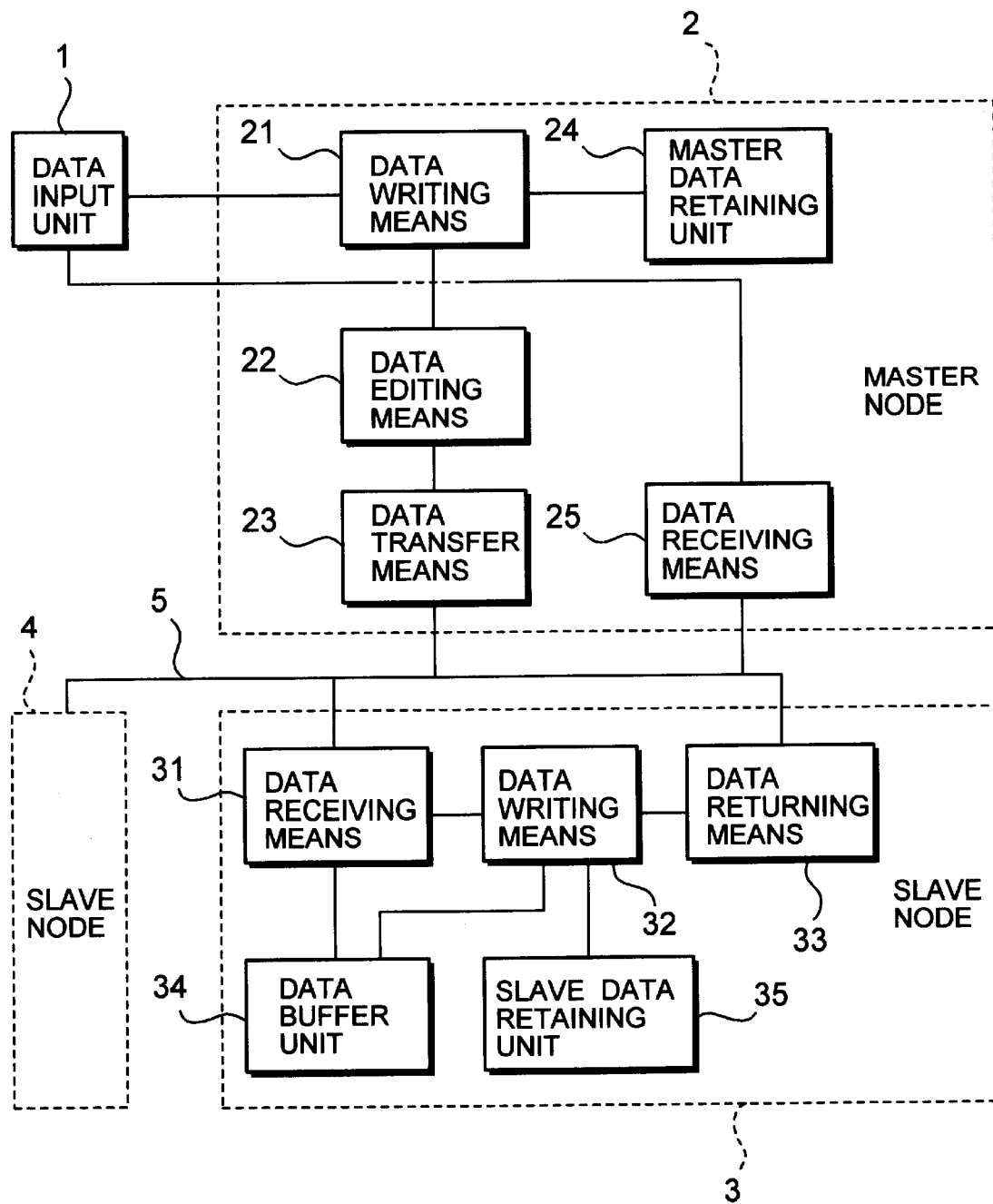
FIG. 1 is a block diagram showing an embodiment of the invention.

Referring to FIG. 1, a PBX network is comprised of a single master node 2 and a plurality of slave nodes 3 and 4. The master node 2 comprises a master data retaining unit 24, a data writing means 21 for writing local data supplied from a data input unit 1 serving as a maintenance terminal into the master data retaining unit 24, a data editing means 22 for editing the input local data (same as the data written into the master data retaining unit 24) together with its checksum and the like into a transfer format, a data transfer means 23 for broadcast transferring the edited data to the slave nodes 3 and 4 through a transmission line 5 which can perform broadcast transfer, and a data receiving means 25 for receiving reply data from the slave nodes 3 and 4 and transferring it to the data input unit 1.

Each of the slave nodes 3 and 4 comprises a data buffer unit 34, a slave data retaining unit 35, a data receiving means 31 for checking if the transfer data from the master node is addressed to the slave node itself and storing it into the data buffer unit 34, a data writing means 32 for writing the local data into the slave data retaining unit 35 when the checksum of the stored transfer data is calculated and matched, and a data returning means 33 for making the data in a predetermined reply format and returning the reply data to the master node 2.

The local data supplied from the data input unit 1 as a maintenance terminal to the master node 2 is written into the master data retaining unit 24 by the data writing means 21. The data editing means 22 edits the data obtained from the data writing means 21 and forms the data in the transfer format.

Figure 2:
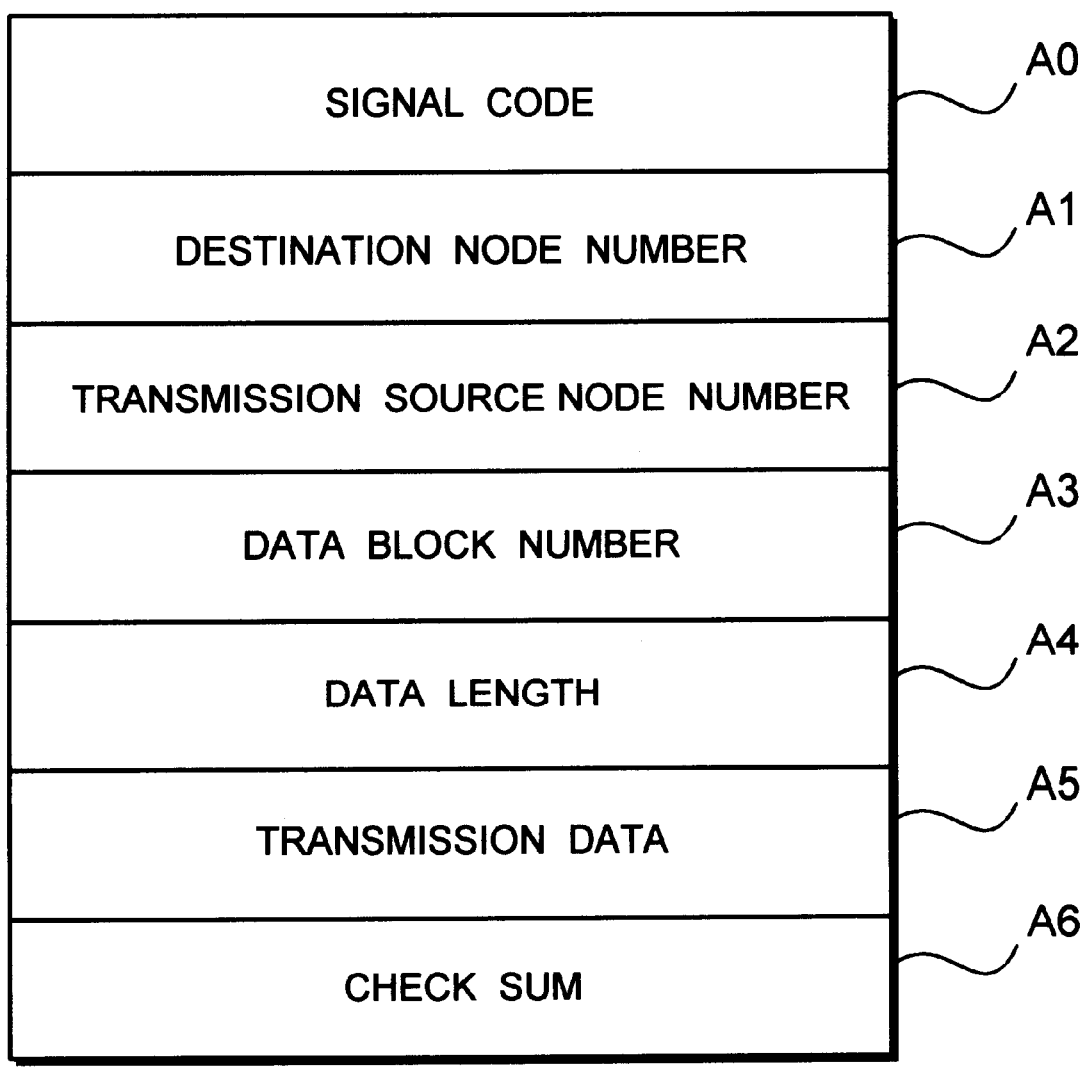
FIG. 2 is a diagram showing the structure of a transfer data format from a master node to a slave node in the embodiment of FIG. 1.

FIG. 2 shows an example of the format of data transferred to the slave nodes 3 and 4. The data format is made up of signal code A0, destination node number A1, transmission source node number A2, data block number A3, data length A4, transmission data A5, and checksum A6.

The signal code A0 is a code indicative of data transfer. The destination node number A1 denotes the destination node number of the slave node 3 or 4. The number of the master node 2 is set in the transmission source node number A2. In the data block number A3, in order to transfer the transmission data by dividing it into blocks each having a predetermined length, a serial number allocated to each divided block is set. The data length A4 shows the length of the transfer data. The actual transmission data is set in the transmission data A5. The checksum A6 of the transfer data is added to the end of the transfer format.

The data transfer means 23 transmits the transfer data of FIG. 2 onto the transmission line 5. As the transmission line 5, an LAN is used when nodes are arranged in the same local network. When the nodes are arranged in remote places, digital dedicated lines are used for connecting LANs. In any case, a transmission line which can perform broadcast transfer at the link layer level by using the broadcast function of Ethernet is employed.

When the data is received from the transmission line 5, the data receiving means 31 in each of the slave nodes 3 and 4 checks whether the destination node A1 in the transfer format is the slave node itself or not. When the destination node A1 is the slave node, the checksum data of the reception data A5 is calculated and compared with the checksum A6. When the data match with each other, it is determined that the reception data is normal and the local data is written into the slave data retaining unit 35.

Figure 3:
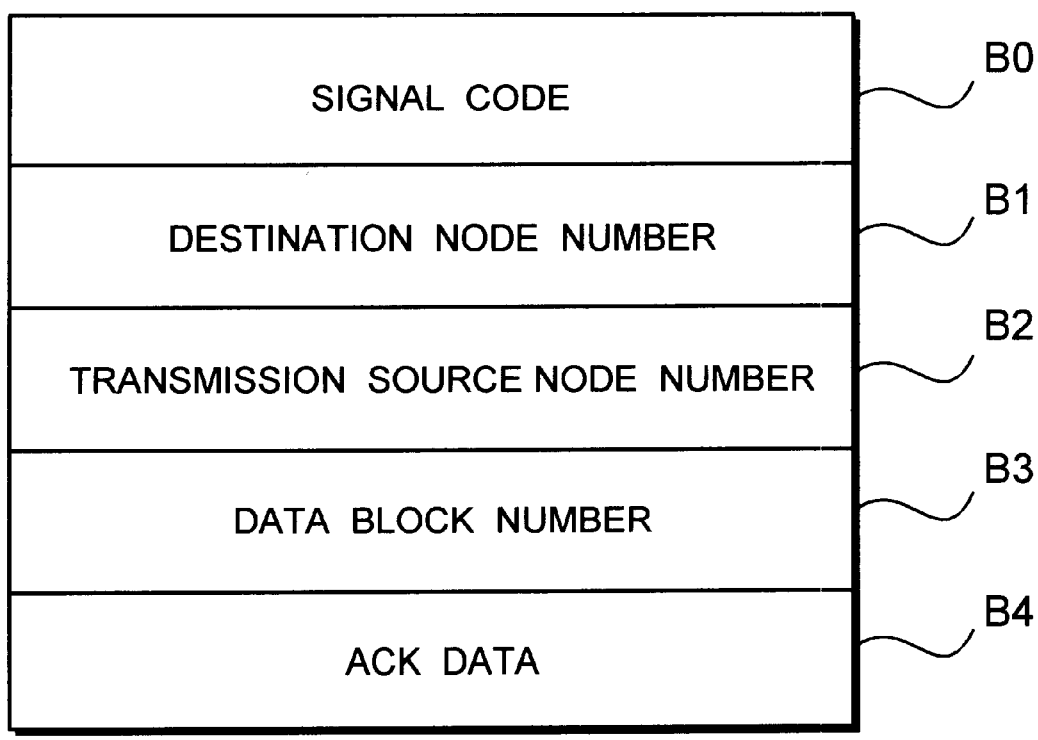
FIG. 3 is a diagram showing the structure of a reply data format from the slave node to the master node in the embodiment of FIG. 1.

FIG. 3 illustrates a reply data format returned from each of the slave nodes 3 and 4 to the master node 2. The reply data format is made up of signal code B0, destination node number B1, transmission source node number B2, data block number B3, and ACK data B4.

The data transmission means 33 forms reply data in such a format, designates a code indicative of ACK of data transfer to the signal code B0 and a master node number to the destination node number B1, and transmits reply data through the transmission line 5. The data receiving means 25 in the master node 2 returns the received data to the data input unit 1, and a series of data inputs is finished.

Figure 4:
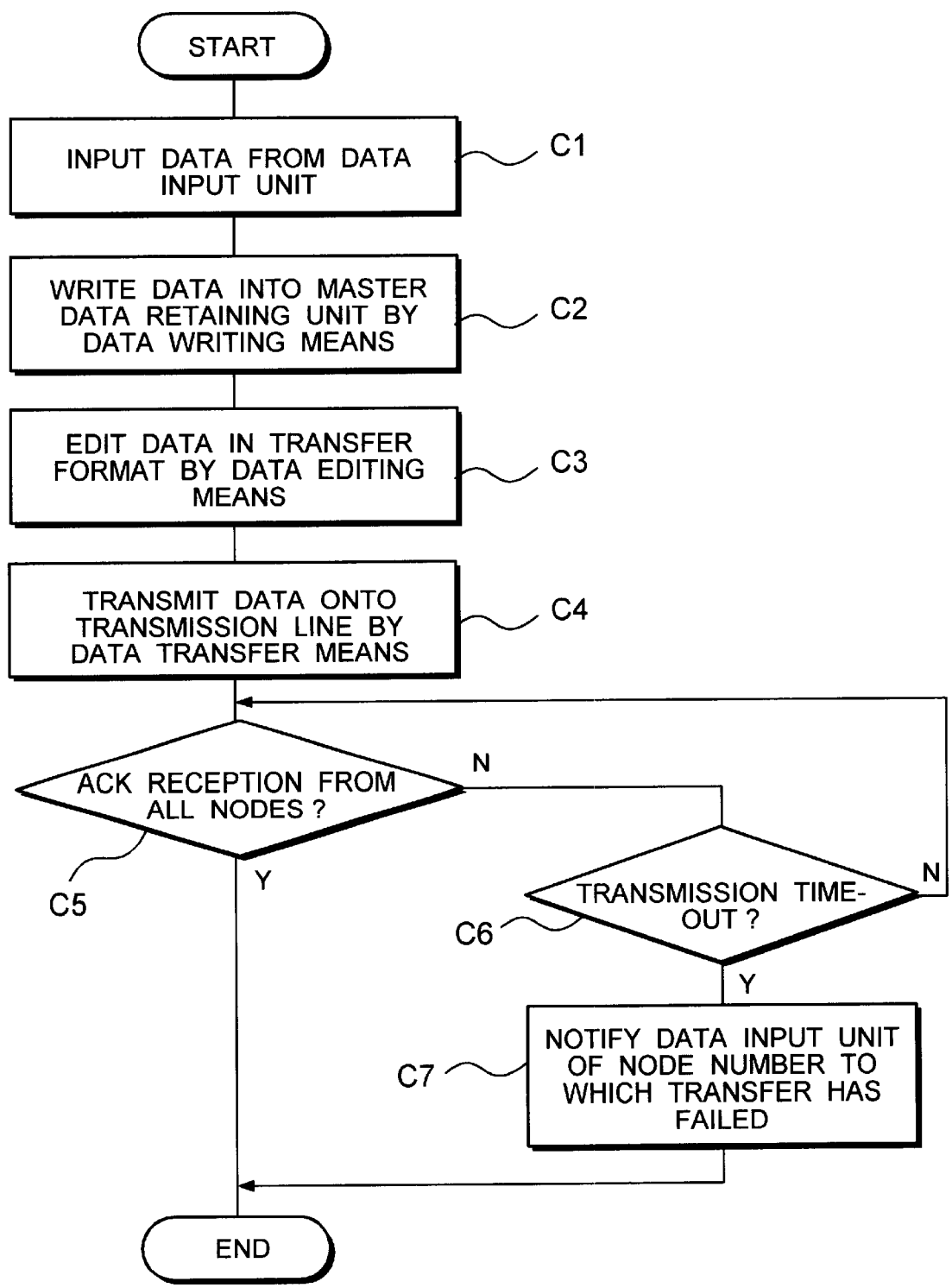
FIG. 4 is a flowchart showing the operation on the master node side in the embodiment of FIG. 1.
Figure 5:
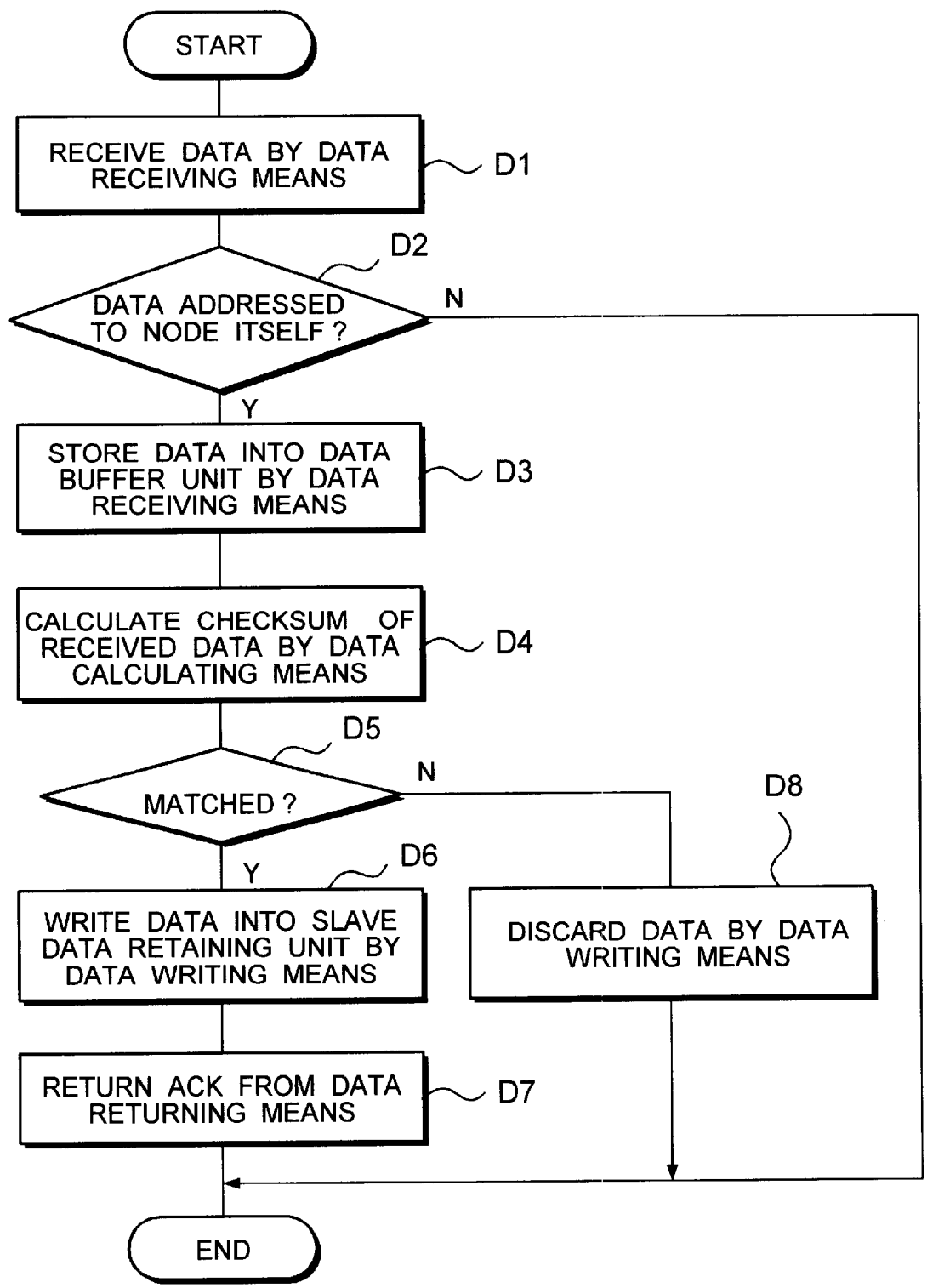
FIG. 5 is a flowchart showing the operation on the slave node side in the embodiment of FIG. 1.

The operation of the embodiment will now be described in detail hereinbelow with reference to the flowcharts of FIGS. 4 and 5. FIG. 4 shows the operation on the master node 2 side. FIG. 5 shows the operation on the slave nodes 3 and 4 side.

When local data is supplied from the data input unit 1 to the master node 2 (step C1 in FIG. 4), the local data is written into the master data retaining unit 24 by the data writing means 21 (step C2). In order to transfer the same data to each of the slave nodes 3 and 4, the data editing means 22 edits the data in a transfer format (step C3). In this case, a code indicative of data transfer is set in the signal code A0. In order to identify each node, the node number unique to each node is preliminarily designated. The node numbers are designated by the numbers 1 to N.

In case of transmitting data from the master node 2 by selectively designating the destination to the slave node 3 or 4, the selected node number is converted to a bit map and set in the destination node number A1. In case of transferring data from the master node 2 to all of the slave nodes 3 and 4, a bit map corresponding to all of the node numbers of destination formed and set in the destination node number A1. In this case, in order to transfer data to all of the slave nodes 3 and 4, a bit map of all of destination nodes is set in the destination node number A1. In the transmission source node number A2, the node number of the master node 2 is set. The data block number A3 is an identification number of each of the data divided into N parts which are designated by numbers 1 to N in order to transfer the local data to the slave nodes 3 and 4 in N parts. The data size of the transfer data is set in the data length A4. The checksum A6 is added in order to assure the reliability of the transmission data A5 and is set in accordance with a predetermined calculation formula.

The data transfer means 23 in the master node 2 transmits the data onto the transmission line 5 (step C4). As the transmission line 5, an LAN (Ethernet) which can perform broadcast transfer at the link layer level is employed. When the slave node 3 or 4 is not in the same local network, the LANs are connected by connecting the remote place through a digital dedicated line so as to be looked like a single LAN. The transfer data transmitted onto the transmission line 5 is transferred to all of the slave nodes 3 and 4 by the broadcasting function of Ethernet.

When the data receiving means 31 in each of the slave nodes 3 and 4 receives data (step D1 in FIG. 5), the data receiving means 31 converts the node number of the slave node itself into a bit map with reference to the destination node number in the transfer format A1 and checks whether the data is addressed to the slave node itself (step S2). When the data is addressed to the slave node itself, the data receiving means 31 checks the signal code A0. When it is the code indicative of data transfer, the data receiving means 31 writes the received data into the data buffer unit 34 (step D3). When the data is not addressed to the slave node itself, it is ignored.

The data writing means 32 in each of the slave nodes 3 and 4 calculates the checksum of the received data A5 (step D4) and checks whether the calculated checksum is the same as the received checksum A6 or not (step D5). If it is the same, the data writing means 32 determines that the received data is normal and writes the local data into the slave data retaining unit 35 (step D6). At this time, in order to prevent data contention upon execution of service by the slave nodes, in the event of writing data to the slave node, the reading operation to the slave data retaining unit 35 is inhibited. When the checksum calculation result does not coincide with the checksum A6, the data writing means 32 determines that the received data is abnormal and discards the data (step D8).

The data returning means 33 in each of the slave nodes 3 and 4 forms reply data in the format shown in FIG. 3 and transmits the data onto the transmission line 5 (step D7). In this case, a code indicative of reply to the transmitted data is designated in the signal code B0 and the node number of the master node 2 is designated in the destination node number B1. As the transmission source node number B2, the node number of the slave node 3 or 4 itself is designated. As the data block number B3, the number same as the data block number A3 of the received data is set. In the ACK data B4, a flag indicative of normal reception of data is set.

The data receiving means 25 in the master node 2 monitors reception of the reply data from all of the slave nodes 3 and 4. When the reply data of FIG. 3 is received, the data receiving means 25 checks whether the destination node number B1 coincides with the node number of itself or not. If yes, the data receiving means 25 recognizes that the data is the reply to the transmitted data on the basis of the signal code B0, checks the transmission source node number B2, compares the transmission source node number B2 with the destination node number A1, and checks whether data reception from all of the nodes has been completed or not (step C5 in FIG. 3). When the numbers coincide with each other, it is regarded that the reception of the reply data from all of the slave nodes 3 and 4 has been completed and the completion is notified to the data input unit 1.

The master node 2 monitors the reception of the reply data for a predetermined time (step C5). When time-out occurs (step C6), a node to which the data has failed to be transferred is notified to the data input unit 1 (step C7). The node to which data transfer has failed is removed from the target nodes to which local data is transferred from the next time on. The normality of the transfer to the destination node is confirmed and the data input unit 1 instructs the data transfer by selectively designating the destination node.

When the transfer target node is selectively designated in the destination node number A1, the data editing means 22 in the master node 2 reads data on a predetermined block unit basis from the master data retaining unit 24 and sets a block identifier in the data block number A3. All of data in the master retaining unit 24 is transferred by the data transferring means 23 to the destination node.

Figure 6:
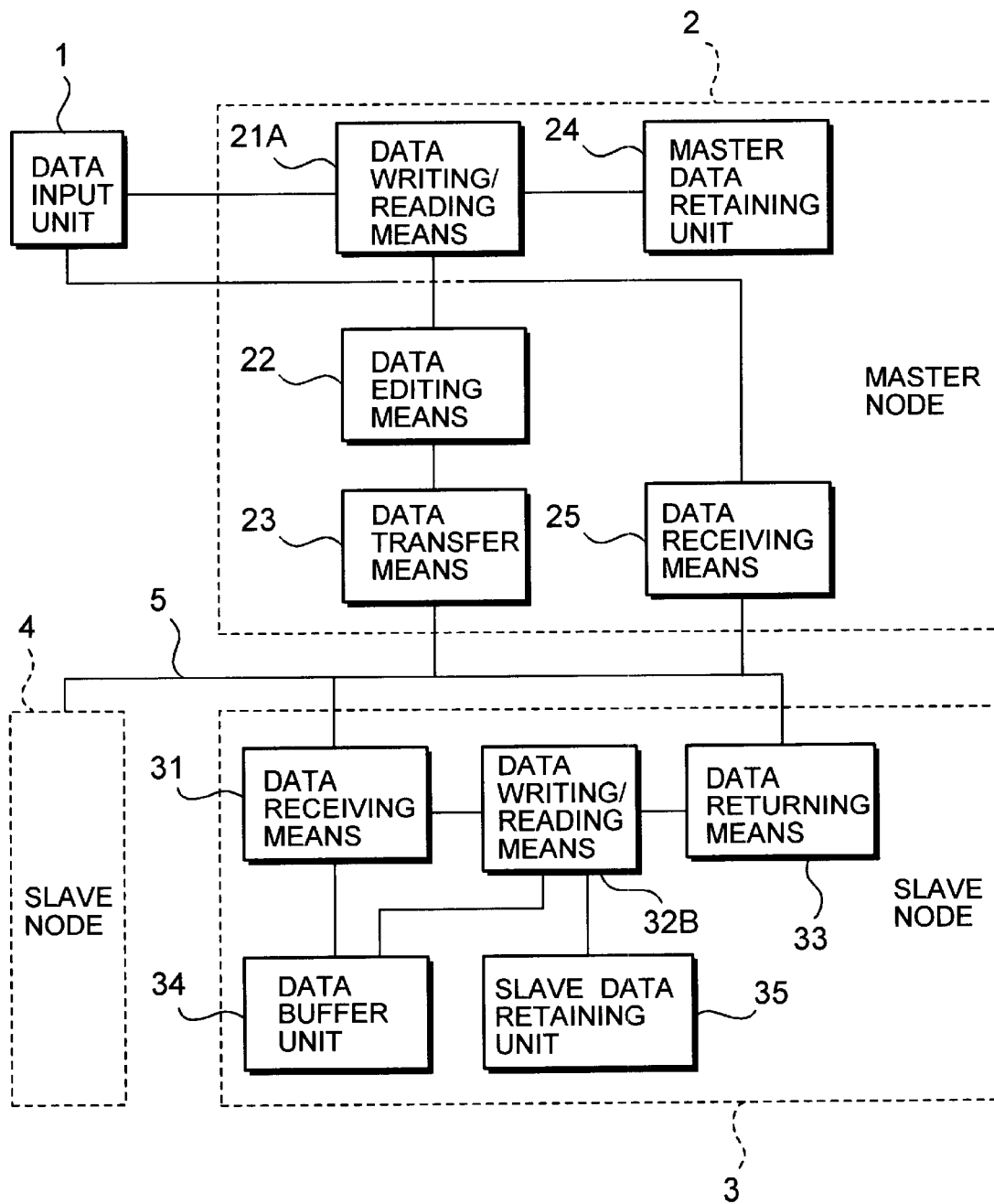
FIG. 6 is a block diagram illustrating another embodiment of the invention.

Another embodiment of the invention will now be described with reference to FIGS. 6, 7, and 8. In the embodiment, arrangement for checking synchronization of data among the master node 2 and the slave nodes 3 and 4 is added to the foregoing embodiment. Consequently, only this arrangement will be described.

Figure 9:
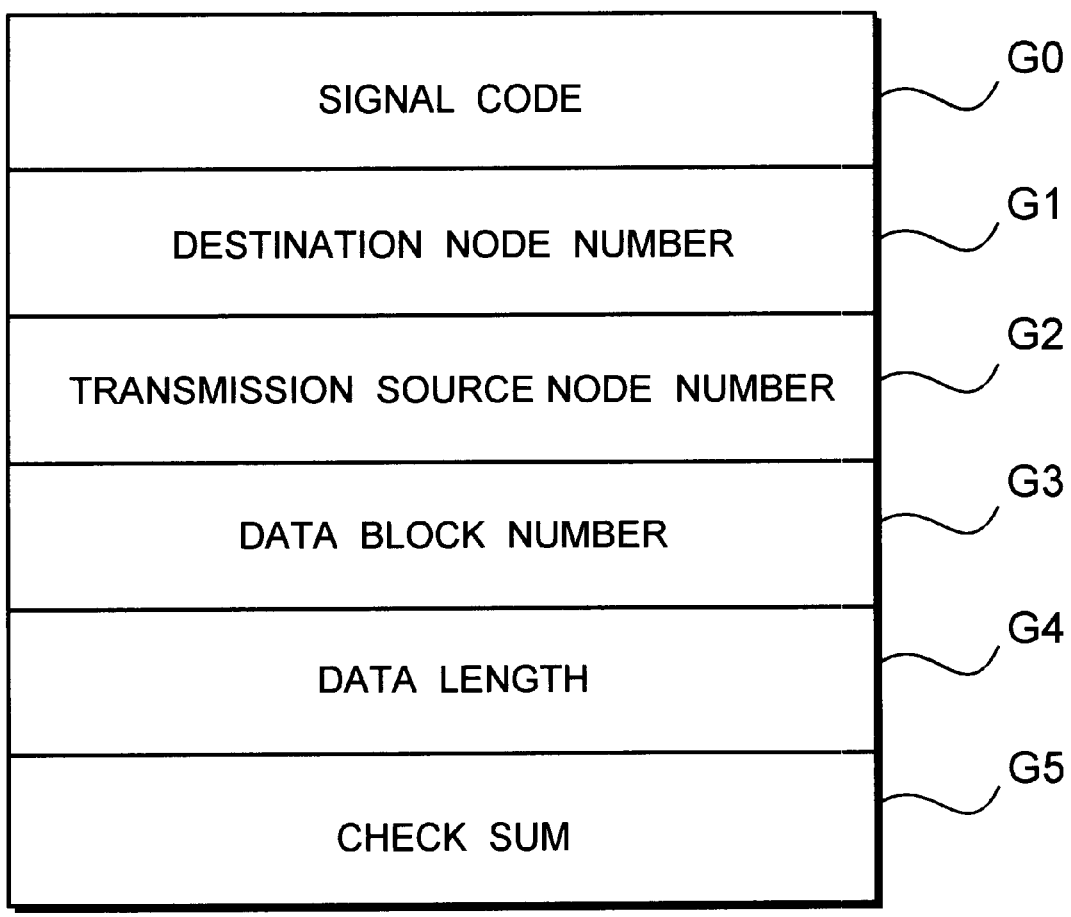
FIG. 9 is a diagram illustrating the structure of a transfer data format from the master node to the slave node in the embodiment of FIG. 6.

In response to an instruction from the data input unit 1 (step E1 in FIG. 7), the data in the master data retaining unit 24 is read by a data writing/reading means 21A in the master node 2 (step E2). The data editing means 22 edits the data into a transfer data format as illustrated in FIG. 9 (step E3). In this case, signal code G0 indicative of collation of data is set at the head. As destination node number G1, the node number of the slave node 3 or 4 as a target of data collation is set. The data in the master data retaining unit 24 is read on a block unit basis and the data block number G3 is given to data of each block unit. The data length G4 indicates the size of one block. The checksum G5 is a calculated checksum of the read block.

The data transfer means 23 in the master node 2 transmits the transfer data onto the transmission line 5 (step E4). The data transfer system on the transmission line 5 is similar to that of the foregoing embodiment.

When the data is received (step F1 in FIG. 8), the data receiving means 31 in each of the slave nodes 3 and 4 converts the node number of itself into a bit map with reference to the destination node number A1 in the transfer format and checks whether the data is addressed to itself or not (step F2). When the data is addressed to the slave node itself, the data receiving means 31 checks the signal code G0, recognizes that the data is a data collation signal, and writes the checksum of the received data into the data buffer unit 34 (step F3). When the data is not addressed to the slave node, it is ignored. The data writing/reading means 32B reads data of an amount of the data length G4 of the block having the same number as the data block number G3 from the slave data retaining unit 35 and calculates the checksum (step F4). The calculation result is compared with the checksum in the data buffer unit 34 (step F5). When they coincide with each other, the data returning means 33 generates ACK data and transmits the ACK data onto the transmission line 5 (step F6). When they do not coincide with each other, the data returning means 33 generates NACK data and transmits the data onto the transmission line 5 (step F7).

Figure 10:
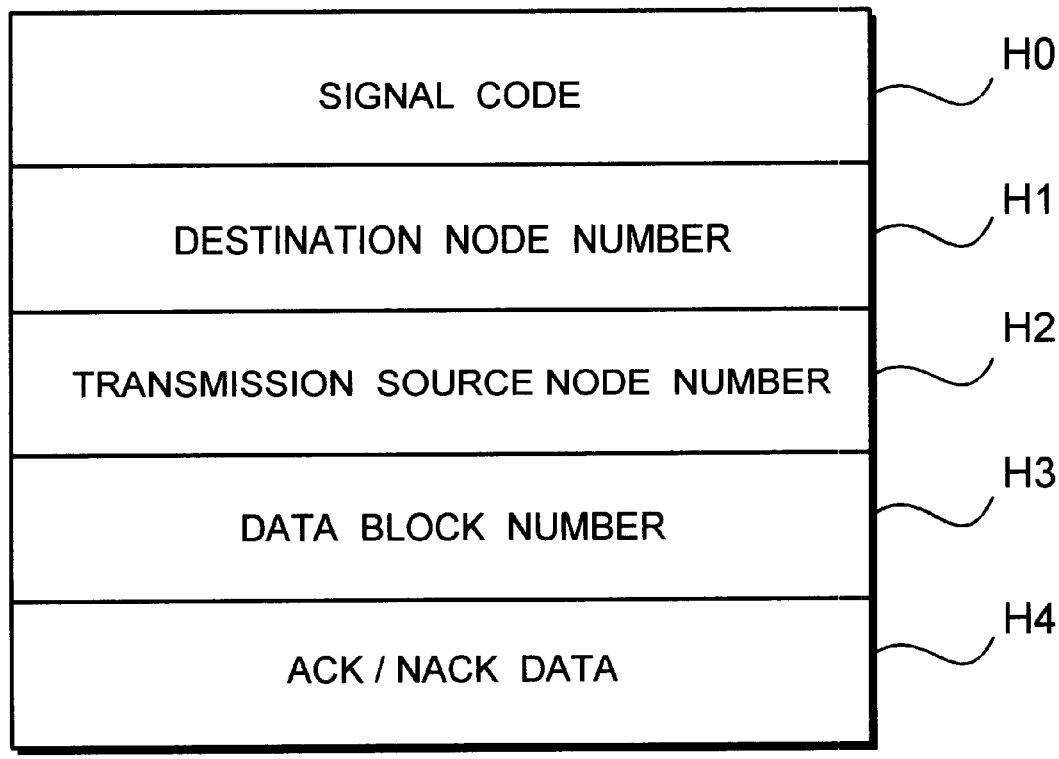
FIG. 10 is a diagram showing a reply data format from the slave node to the master node in the embodiment of FIG. 6.

The format of the ACK data or NACK data in this case is constructed as shown in FIG. 10. In signal code H0, a return code of data collation is set. In destination node number H1, the node number of the master node 2 is designated. In transmission source node number H2, the node number of the slave node 3 or 4 is designated. In data block number H3, the same number as the data block number G3 of the received data is set. In ASK/NACK data H4, a flag indicating that the checksum collation is normal or abnormal is set.

Figure 7:
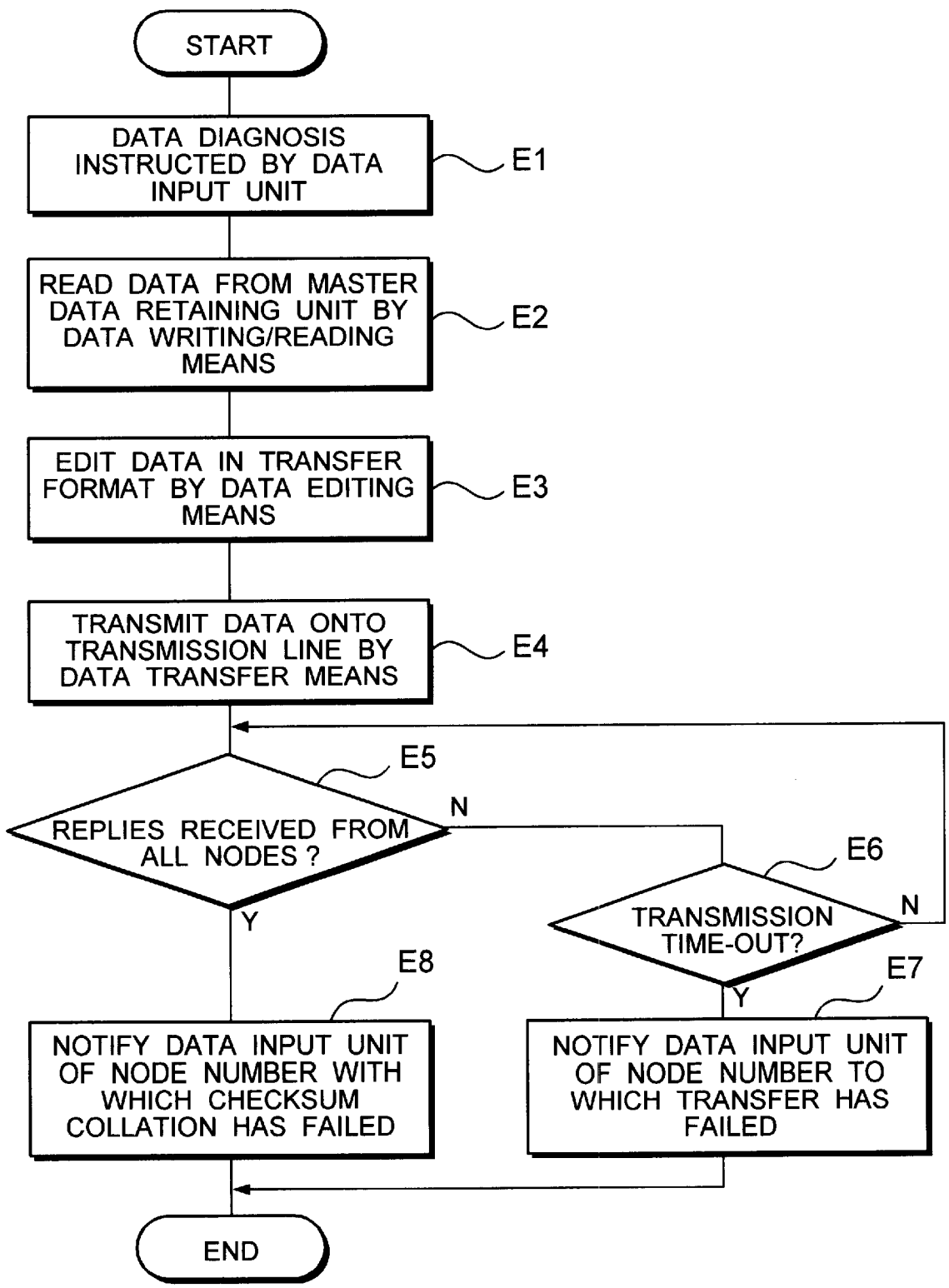
FIG. 7 is a flowchart showing the operation on the master node side in the embodiment of FIG. 6.
Figure 8:
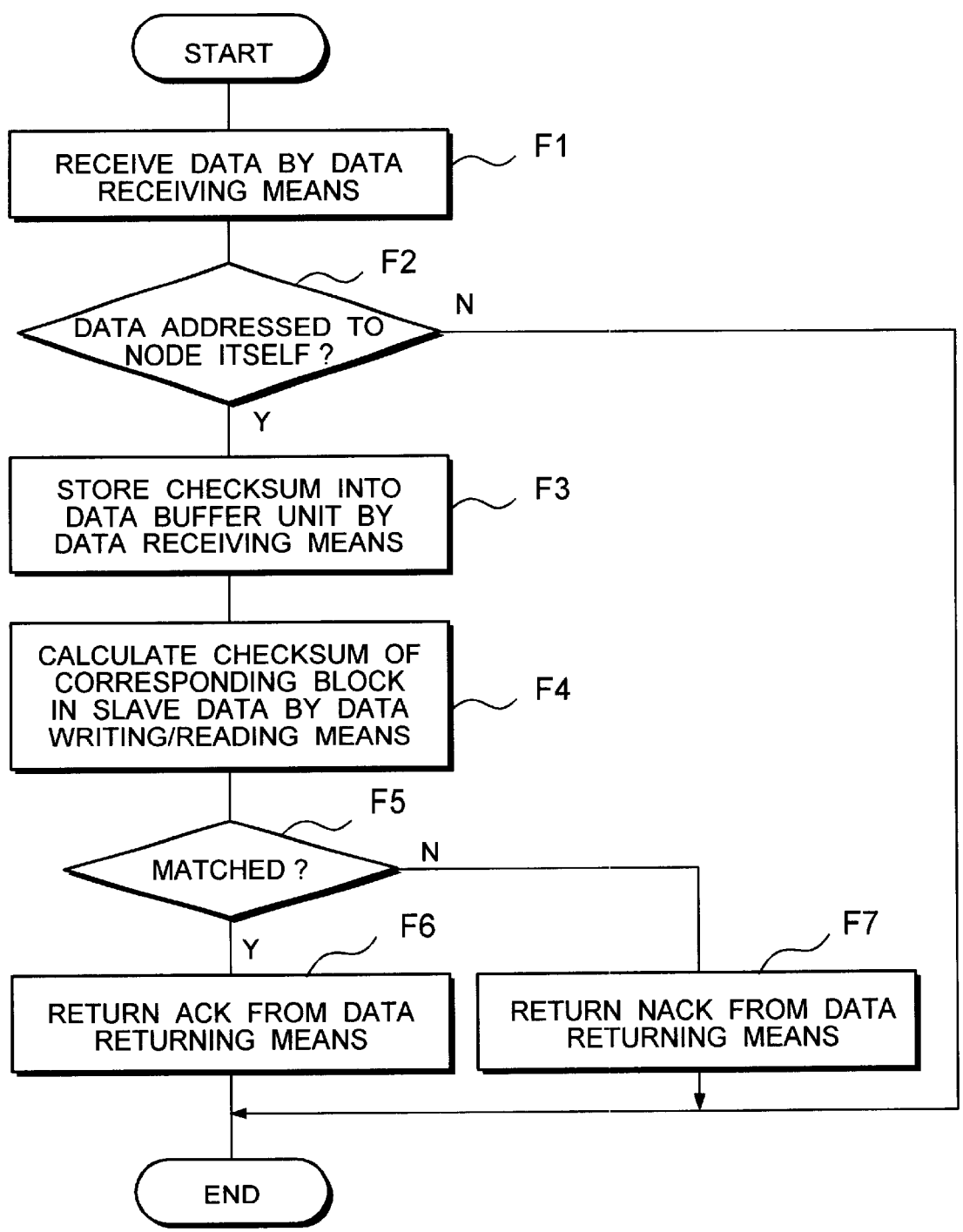
FIG. 8 is a flowchart showing the operation on the slave node side in the embodiment of FIG. 6.

The data receiving means 25 in the master node 2 monitors collation result data from all of the slave nodes 3 and 4 (step E5 in FIG. 7). When data collation return data of FIG. 10 is received, the data receiving means 25 checks whether the destination node number H1 is the number of itself or not. When the data is addressed to itself, the ACK/NACK data H4 and the transmission source node number H2 are checked. Whether the reception of the collation results from all of the nodes designated by the destination node numbers H1 has been completed or not is checked. When replies from all of the nodes have been received, a checksum collation failed node is notified to the data input unit 1 (step E8).

The master node 2 monitors the reply data reception for a predetermined time (step E6). When time-out occurs, a node to which data transfer has been failed is notified to the data input unit 1 (step E7). The node to which the transfer has been failed is removed from the data collation target nodes from the next time on. The normality of the transfer to the destination node is confirmed, and the data input unit 1 instructs data transfer by designating a selected destination node.

In the embodiment, it is also possible to construct so that the master node 2 independently performs the data collation with the slave nodes 3 and 4 even if there is no instruction from the data input unit 1.

According to the invention, the following effects are produced.

1. Data can be transferred to all of nodes by a single operation from a maintenance terminal, so that the operability is improved greatly.

2. Data synchronization among nodes can be easily checked so that loss of data synchronization can be prevented.

What is claimed is:

1. A method of distributing data to nodes in a PBX network, comprising the steps of:
   setting one of a plurality of nodes constructing the PBX network to a master node and setting the other nodes to slave nodes;
   retaining local data supplied from a data input unit to the master node into a data retaining unit in the master node;
   in the master node, forming the local data in a transfer format by adding a checksum and a destination node designated to each slave node to the local data and transferring the local data in the transfer format to the slave node; and
   in each slave node, storing the local data into a data retaining unit in the slave node after checking whether the designated destination node is the slave node itself or not and checking the checksum.

2. A data distributing method according to claim 1, wherein the data transfer from the master node to each of the slave nodes is performed by broadcast transfer through a transmission line which can perform broadcast transfer.

3. A data distributing method according to claim 1, wherein each of the slave nodes retains the local data in its data retaining unit, the slave node returns reply data formed in a reply format in which the node number of the slave node is set as a transmission source and the node number of the master node is set as a destination, and the master node receives the reply data and transfers it to the data input unit.

4. A data distributing method according to claim 1, wherein the master node makes the data length of the local data included in the transfer format and transfers the local data in the transfer format.

5. A data distributing method according to claim 1, wherein the master node divides the local data every predetermined length into blocks, makes a serial number of each block included in the transfer format, and transfers the data in the transfer format.

6. A data distributing method according to claim 1, wherein the same data as the local data which is transferred to the slave node and stored in the data retaining unit in the slave node is similarly transferred for data collation from the master node, and each of the slave nodes collates the local data newly transferred with the local data which has been already retained in its data retaining unit and returns a collation result in a reply format in which the node number of the slave node is set as a transmission source and the node number of the master node is set as a destination to the master node.

7. A system for distributing data to nodes in a PBX network, wherein one of a plurality of nodes constructing a PBX network is set as a master node and the other nodes are set as slave nodes,
   the master node comprises a master data retaining unit, data writing means for writing local data supplied from a data input unit into the master data retaining unit, data editing means for editing the supplied local data together with a checksum of the local data and a destination node designated to each of the slave nodes into a transfer format, and data transfer means for broadcast transferring the edited data through a transmission line which can perform broadcast transfer to the slave node, and
   each of the slave nodes comprises a slave data retaining unit, data receiving means for checking whether data transferred from the master node is addressed to the slave node itself or not and receiving the data, and data writing means for writing the local data into the slave data retaining unit when the checksum of the received transfer data is checked and matched.

8. A data distributing system according to claim 7, wherein each of the slave nodes comprises data return means for forming the data in a reply format in which the node number of the slave node itself is set as a transmission source and the node number of the master node is set as a destination after the local data is retained in the slave data retaining unit of the slave node and returning reply data in the format to the master node, and
   the master node has data receiving means for receiving the data returned from the slave node and transferring the data to the data input unit.

9. A data distributing system according to claim 7, wherein the data editing means in the master node makes the data length of the local data included in the transfer format.

10. A data distributing system according to claim 7, wherein the data editing means in the master node divides the local data into blocks on a predetermined length unit basis and makes a serial number of each block included in the transfer format.

11. A data distributing system according to claim 7, wherein the data transfer means in the master node similarly transfers the local data for data collation, which is the same as the local data transferred to the slave node and stored in the slave data retaining unit in the slave node, each of the slave nodes is further provided with a data buffer unit for storing the local data newly transferred and data collating means for collating the local data stored in the data buffer unit with the local data which has been already retained in the data retaining unit, and the data returning means in each of the slave nodes returns a collation result in a reply format in which the node number of the slave node itself is set as a transmission source and the node number of the master node is set as a destination to the master node.

12. A data distributing method according to claim 2, wherein each of the slave nodes retains the local data in its data retaining unit, the slave node returns reply data formed in a reply format in which the node number of the slave node is set as a transmission source and the node number is set as a destination, and the master node receives the reply data and transfers it to the data input unit.

13. A data distributing method according to claim 2, wherein the master node makes the data length of the local data included in the transfer format and transfers the local data in the transfer format.

14. A data distributing method according to claim 3, wherein the master node makes the data length of the local data included in the transfer format and transfers the local data in the transfer format.

15. A data distributing method according to claim 2, wherein the master node divides the local data every predetermined length into blocks, makes a serial number of each block included in the transfer format, and transfers the data in the transfer format.

16. A data distributing method according to claim 3, wherein the master node divides the local data every predetermined length into blocks, makes a serial number of each block included in the transfer format, and transfers the data in the transfer format.

17. A data distributing method according to claim 4, wherein the master node divides the local data every predetermined length into blocks, makes a serial number of each block included in the transfer format, and transfers the data in the transfer format.

18. A data distributing method according to claim 2, wherein the same data as the local data which is transferred to the slave node and stored in the data retaining unit in the slave node is similarly transferred for data collation from the master node, and each of the slave nodes collates the local data newly transferred with local data which has been already retained in its data retaining unit and returns a collation result in a reply format in which the node number of the slave node is set as a transmission source and the node number of the master node is set as a destination to the master node.

19. A data distributing method according to claim 3, wherein the same data as the local data which is transferred to the slave node and stored in the data retaining unit in the slave node is similarly transferred for data collation from the master node, and each of the slave nodes collates the local data newly transferred with local data which has been already retained in its data retaining unit and returns a collation result in a reply format in which the node number of the slave node is set as a transmission source and the node number of the master.

20. A data distributing method according to claim 4, wherein the same data as the local data which is transferred to the slave node and stored in the data retaining unit in the slave node is similarly transferred for data collation from the master node, and each of the slave nodes collates the local data newly transferred with local data which has been already retained in its data retaining unit and returns a collation result in a reply format in which the node number of the slave node is set as a transmission source and the node number of the master node is set as a destination to the master node.

21. A data distributing method according to claim 5, wherein the same data as the local data which is transferred to the slave node and stored in the data retaining unit in the slave node is similarly transferred for data collation from the master node, and each of the slave nodes collates the local data newly transferred with local data which has been already retained in its data retaining unit and returns a collation result in a reply format in which the node number of the slave node is set as a transmission source and the node number of the master node is set as a destination to the master node.

22. A data distributing system according to claim 8, wherein the data editing means in the master node makes the data length of the local data included in the transfer format.

23. A data distributing system according to claim 8, wherein the data editing means in the master node divides the local data into blocks on a predetermined length unit basis and makes a serial number of each block included in the transfer format.

24. A data distributing system according to claim 9, wherein the data editing means in the master node divides the local data into blocks on a predetermined length unit basis and makes a serial number of each block included in the transfer format.

25. A data distributing system according to claim 8, wherein the data transfer means in the master node similarly transfers the local data for data collation, which is the same as the local data transferred to the slave node and stored in the slave data retaining unit in the slave node, each of the slave nodes is further provided with a data buffer unit for storing the local data newly transferred and data collating means for collating the local data stored in the data buffer unit with the local data which has been already retained in the data retaining unit, and the data returning means in each of the slave nodes returns a collation result in a reply format in which the node number of the slave node itself is set as a transmission source and the node number of the master node is set as a destination to the master node.

26. A data distributing system according to claim 9, wherein the data transfer means in the master node similarly transfers the local data for data collation, which is the same as the local data transferred to the slave node and stored in the slave data retaining unit in the slave node, each of the slave nodes is further provided with a data buffer unit for storing the local data newly transferred and data collating means for collating the local data stored in the data buffer unit with the local data which has been already retained in the data retaining unit, and the data returning means in each of the slave nodes returns a collation result in a reply format in which the node number of the slave node itself is set as a transmission source and the node number of the master node is set as a destination to the master node.

* * * * *